United States Patent
Cora et al.

(10) Patent No.: US 11,720,616 B2
(45) Date of Patent: Aug. 8, 2023

(54) CUSTOMIZING DIGITAL CONTENT WITH EDITORIAL CONTENT

(71) Applicant: Flipboard, Inc., Redwood City, CA (US)

(72) Inventors: Vlad Ionut Cora, Burnaby (CA); Benjamin John Frederickson, Vancouver (CA); John T. Mazzeo, San Francisco, CA (US); Michael S. McCue, Palo Alto, CA (US)

(73) Assignee: FLIPBOARD, INC., Redwood City, CA (US)

( * ) Notice: Subject to any disclaimer, the term of this patent is extended or adjusted under 35 U.S.C. 154(b) by 0 days.

(21) Appl. No.: 17/153,321

(22) Filed: Jan. 20, 2021

(65) Prior Publication Data
US 2021/0141821 A1     May 13, 2021

Related U.S. Application Data

(63) Continuation of application No. 15/887,408, filed on Feb. 2, 2018, now Pat. No. 10,929,450.

(60) Provisional application No. 62/455,496, filed on Feb. 6, 2017.

(51) Int. Cl.
| | |
|---|---|
| *G06F 16/34* | (2019.01) |
| *G06F 16/81* | (2019.01) |
| *G06N 20/00* | (2019.01) |
| *G06F 16/957* | (2019.01) |
| *G06F 18/214* | (2023.01) |

(52) U.S. Cl.
CPC ............. *G06F 16/34* (2019.01); *G06F 16/81* (2019.01); *G06F 16/9577* (2019.01); *G06F 18/214* (2023.01); *G06N 20/00* (2019.01)

(58) Field of Classification Search
CPC ...... G06F 16/34; G06F 16/81; G06F 16/9577; G06K 9/6256
See application file for complete search history.

(56) References Cited

U.S. PATENT DOCUMENTS

| | | |
|---|---|---|
| 8,370,348 B1 | 2/2013 | Reilly et al. |
| 8,805,840 B1 | 8/2014 | Joshi et al. |
| 8,990,200 B1 | 3/2015 | Christensen et al. |
| 9,881,010 B1 | 1/2018 | Gubin et al. |
| 2005/0033770 A1 | 2/2005 | Oglesby et al. |

(Continued)

OTHER PUBLICATIONS

United States Office Action, U.S. Appl. No. 15/887,408, dated Apr. 17, 2020, 16 pages.

*Primary Examiner* — Tyler J Torgrimson
*Assistant Examiner* — Maher N Algibhah
(74) *Attorney, Agent, or Firm* — Fenwick & West LLP

(57) ABSTRACT

A digital magazine server generates a digital magazine for user based on a received request for the digital magazine identifying one or more topics. The digital magazine server applies one or more machined trained models to obtained content items to select content items for the topic. A hierarchy of the topics included in the received request may be determined by the digital magazine server and used by the trained models to select content items. When generating the digital magazine, the digital magazine server also includes one or more editorial content items that are manually selected. The digital magazine serer may reposition one or more content items selected by the trained models to include an editorial content items.

17 Claims, 6 Drawing Sheets

(56) References Cited

U.S. PATENT DOCUMENTS

| | | | |
|---|---|---|---|
| 2006/0242098 | A1 | 10/2006 | Wnek |
| 2009/0132553 | A1* | 5/2009 | Kohn ................... G06Q 30/02 |
| 2012/0290637 | A1 | 11/2012 | Perantatos et al. |
| 2013/0097186 | A1 | 4/2013 | van Hoff |
| 2014/0075275 | A1 | 3/2014 | Aleksandrovsky et al. |
| 2014/0278968 | A1 | 9/2014 | Strompolos et al. |
| 2014/0297655 | A1 | 10/2014 | Paglia et al. |
| 2015/0019957 | A1* | 1/2015 | Ying ................... G06F 40/186 |
| | | | 715/243 |
| 2015/0149261 | A1 | 5/2015 | Walkingshaw et al. |
| 2015/0186491 | A1 | 7/2015 | Zukerman et al. |
| 2015/0245083 | A1 | 8/2015 | Schneider et al. |
| 2015/0248683 | A1 | 9/2015 | Walkingshaw |
| 2016/0147891 | A1 | 5/2016 | Chhichhia et al. |
| 2016/0225012 | A1 | 8/2016 | Ha et al. |
| 2016/0364419 | A1* | 12/2016 | Stanton ............... G06F 16/2453 |

* cited by examiner

CUSTOMIZING DIGITAL CONTENT WITH EDITORIAL CONTENT

CROSS REFERENCE TO RELATED APPLICATIONS

This application is a continuation of U.S. application Ser. No. 15/887,408, filed Feb. 2, 2018 which claims the benefit of U.S. Provisional Application No. 62/455,496, filed Feb. 6, 2017, which is incorporated by reference in its entirety.

BACKGROUND

This disclosure relates generally to digital content publishing and more specifically to customizing digital content in a digital magazine with editorial content.

Digital distribution channels disseminate a wide variety of digital content including text, images, audio, links, videos, and interactive media (e.g., games, collaborative content) to users. Users often interact with content items provided by various sources or content providers, such as social networking systems, online publishers, and blogs. A content item provided by a source is often based on the content of a resource on the Internet identified by a universal resource locator (URL).

Digital magazines select digital content for presentation to users of a digital magazine server. Many conventional methods for selecting digital content rely on content selection algorithms that predominantly select content based on popularity of various content items. However, selecting content items based on popularity can bias presentation of content to a particular user by not considering the particular user's level of satisfaction with presented content items, which may impair user interaction or engagement with a digital magazine provided to the particular user.

SUMMARY

A digital magazine is a personalized, customizable collection of content items selected from various sources for presentation to a user of a digital magazine server via a client device (e.g., a mobile communication device, tablet, computer, and any other suitable computing system). For example, the digital magazine server receives a request for a digital magazine from a client device identifying the user and indicating a topic for the digital magazine. Based on one or more models trained on a corpus of training data using one or more machine-learned models, the digital magazine server selects content items (i.e., machine-selected content items) for the topic and generates a machine-selected package including the machine-selected content items. In some embodiments, the digital magazine server also ranks the machine-selected content items based on one or more ranking factors. Example ranking factors include content item popularity, quality of publisher/content provider, and user satisfaction. In some embodiments, the digital magazine server sends the machine-selected package to the client device for presentation to the user in response to the request for a digital magazine.

In other embodiments, the digital magazine server customizes the machine-selected package with an editorial package including one or more editorial content items that are manually selected by magazine editors. The editorial package is tagged with one or more topics, one of which is related to the topic of the machine-selected package. The digital magazine server injects one or more editorial content items of the editorial package into the machine-selected package based on one or more mappings of editorial packages to one or more machine-selected packages associated with a topic matching the topic associated with an editorial package, or other information. In some embodiments, the digital magazine server maintains a positional index identifying a position within the machine-selected package where an editorial content item is included. Injecting one or more editorial content items into the machine-selected package allows the digital magazine server to generate a customized digital magazine including the machine-selected package and one or more of the editorial content items. The customized digital magazine is sent to the client device for presentation to the user.

DETAILED DESCRIPTION

Digital Magazine System Environment

A digital magazine is a personalized, customizable collection of digital content items selected for a user of a digital magazine server for presentation to a user of a client device (e.g., a mobile communication device, tablet, computer, and any other suitable computing system). For example, the digital magazine server maintains information describing a user's interests or preferences and selects content items from various sources for presentation to a user based on the user's interests and preferences. The digital magazine server sends the selected content items to a client device associated with the user along with instructions for presenting the selected content items in a digital magazine to the user. A digital magazine application executing on the client device generates the digital magazine presenting the selected content items to the user based on the received instructions. The generated digital magazine allows the user to more easily view digital content by presenting content items in an easily navigable interface via the client device.

As used herein, a "digital magazine" refers to an aggregation of digital content items presented to users in positions relative to each other determined by a layout specified by the digital magazine server. In various embodiments, the layout specified by the digital magazine server resembles formats used by print magazines. In one embodiment, a digital magazine assembles a list of universal resource locators (URLs), where each content item of the digital magazine is based on content from a source identified by a corresponding URL of the list of the URLs. A "content item" herein refers to any machine-readable and machine-storable work product, such as textual articles, pictures, images, videos, user-generated content (e.g., content posted on a social networking system or content items stored in the local memory of a computing device used by the user), advertisements, and any other types of digital content capable of display within the context of a digital magazine.

Figure 1:
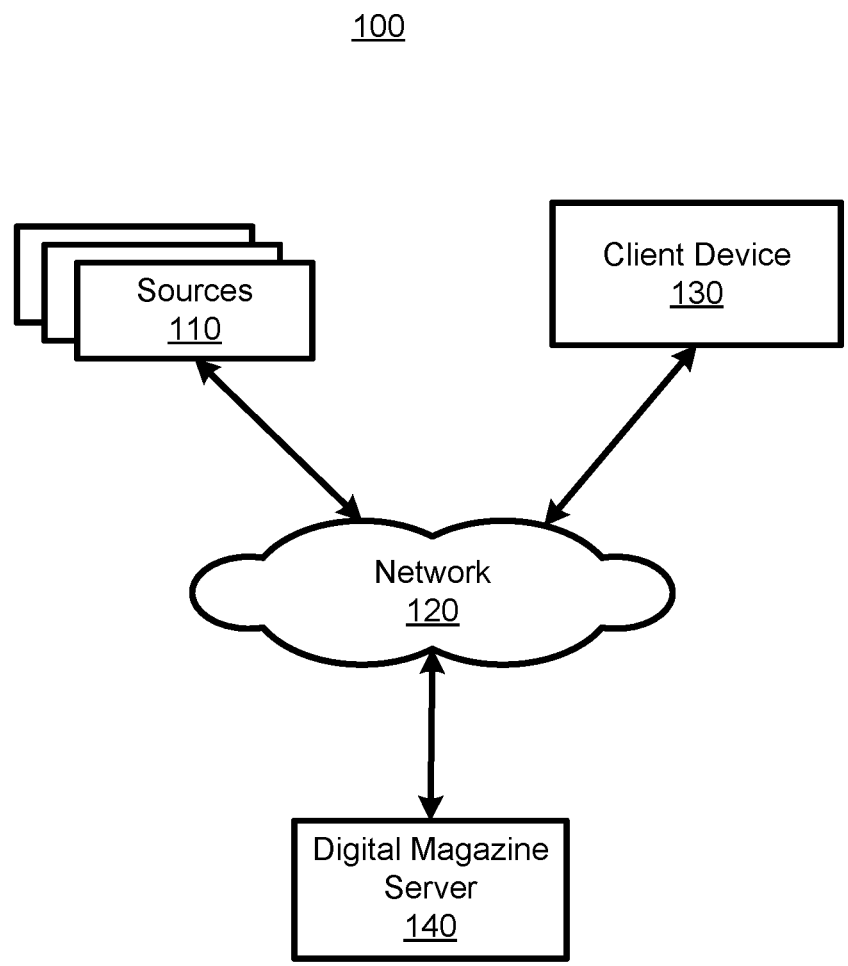
FIG. 1 is a high-level block diagram illustrating a system environment in which a digital magazine server operates, according to one embodiment.

FIG. 1 is a high-level block diagram illustrating a system environment 100 in which a digital magazine server 140 operates according to one embodiment. The system environment 100 shown in FIG. 1 includes one or more sources 110, a network 120, a client device 130, and a digital magazine server 140. In alternative configurations, different or additional components may be included in the system environment 100. The embodiments described herein can be adapted to online systems that are not digital magazine servers 140 in various embodiments.

A source 110 is a computing system capable of providing various types of content to the client device 130 and the digital magazine server 140. In one embodiment, a content item provided by a source 110 is based on content of a resource coupled to a network 120 and identified by a network identifier, such as a Uniform Resource Locator (URL). For example, a source 110 is identified by a domain name included in a URL, which also includes information identifying content maintained by the source 110 corresponding to the domain name of the URL. Examples of content provided by a source 110 include text, images, video, or audio on web pages, web feeds, social networking information, messages, and other suitable data. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as one or more "content items," or as "content." A content item may include various types of objects, such as text, images, and video.

The sources 110 communicate with the client device 130 and the digital magazine server 140 via the network 120. The network 120 may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is a computing device capable of receiving user input as well as transmitting and/or receiving data via the network 120. Various embodiments of the client device 130 include a conventional computer system, such as a desktop or a laptop computer, and a device having computer functionality, such as a personal digital assistant (PDA), a mobile telephone, a smartphone, a smartwatch, or another suitable device. Different client devices 130 may have different characteristics such as different processing capabilities, different connection speeds with the digital magazine server 140 over the network 120, and different device types (e.g., make, manufacture, and version).

In some embodiments, the client device 130 executes a digital magazine application allowing a user of the client device 130 to interact with the digital magazine server 140. For example, the digital magazine application executing on the client device 130 communicates user input, which includes a request for a digital magazine, to the digital magazine server 140 and receives a digital magazine generated by the digital magazine server 140 based on the user input. The client device 130 also executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130 for simplicity, in various embodiments, any number of client devices 130 may communicate with the digital magazine server 140.

In various embodiments, the client device 130 includes a display device, an input device, and a storage device. The display device presents content, such as that comprising a digital magazine received from the digital magazine server 140, to a user of the client device 130. Examples of a display device include a liquid crystal display (LCD), an organic light emitting diode (OLED) display, and an active matrix liquid crystal display (AMLCD). Different client devices may have display devices with different characteristics. For example, different client devices have display devices with different display areas, different resolutions, or differences in other characteristics.

The input device receives input from a user of the client device 130. For example, the input device receives a request from a user for a digital magazine or other content. Different input devices may be included in the client device 130. For example, the client device 130 may include a touch-sensitive display for receiving input data, commands, or information from a user. Using a touch-sensitive display allows the client device 130 to combine the display device and the input device, simplifying user interaction with presented content items. In other embodiments, the client device 130 may include a keyboard, a trackpad, a mouse, or any other device capable of receiving input from a user. Additionally, the client device 130 may include multiple input devices in some embodiments. Inputs received via the input device may be processed by a digital magazine application associated with the digital magazine server 140 and executing on the client device 130 to allow a user to interact with content items presented by the digital magazine server 140.

The storage device of the client device 130 includes content for presentation to the user. Additionally, the storage device maintains instructions that, when executed by a processor of the client device 130, cause the client device 130 to provide various functionalities to the user. For example, the storage device maintains instructions that, when executed by the processor of the client device 130, cause the client device 130 to execute one or more applications. In some embodiments, instructions maintained by the storage device cause a digital magazine application associated with the digital magazine server 140 and executing on the client device 130 to retrieve content items included in the storage device and present the content items to the user.

The digital magazine server 140 receives content items from one or more sources 110, generates pages in a digital magazine by processing the received content, and provides the pages to the client device 130. The digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

In various embodiments, the digital magazine server 140 receives a request for a digital magazine from the client device 130 that identifies a user of the digital magazine server 140 and one or more topics. For each topic included in the request, the digital magazine server 140 generates a digital magazine including digital content relevant to the topic and sends the digital magazine to the client device 130. In other embodiments, the digital magazine server 140 receives an indication that the user is accessing (e.g., logging-in to) a digital magazine application associated with the digital magazine server 140 and executing on the client device 130. The indication includes information identifying the user to the digital magazine server 140, which retrieves a user profile or other information maintained by the digital magazine server 140 in association with the user. For example, the digital magazine server 140 retrieves one or more interests included in a user profile maintained by the digital magazine server 140 for the user and generates a digital magazine based on one or more interests retrieved from the user profile.

In various embodiments, a digital magazine generated by the digital magazine server 140 includes machine-selected content items selected by the digital magazine server 140 based on one or more machine-learned models trained on a corpus of training data from the sources 110 and applied to content items from one or more sources 110. As further described below in conjunction with FIGS. 3-5, the digital magazine server 140 also includes one or more editorial content items along with machine-selected content items in the digital magazine. Editorial content items are content items manually selected from the sources 110 by one or more editors. The digital magazine server 140 may regularly update, with or without requests from the client device 130, one or more digital magazines for a user and communicate the updated digital magazines to the client device 130. More details about the digital magazine server 140 are discussed in conjunction with FIG. 2 and FIG. 3.

Digital Magazine Server

Figure 2:
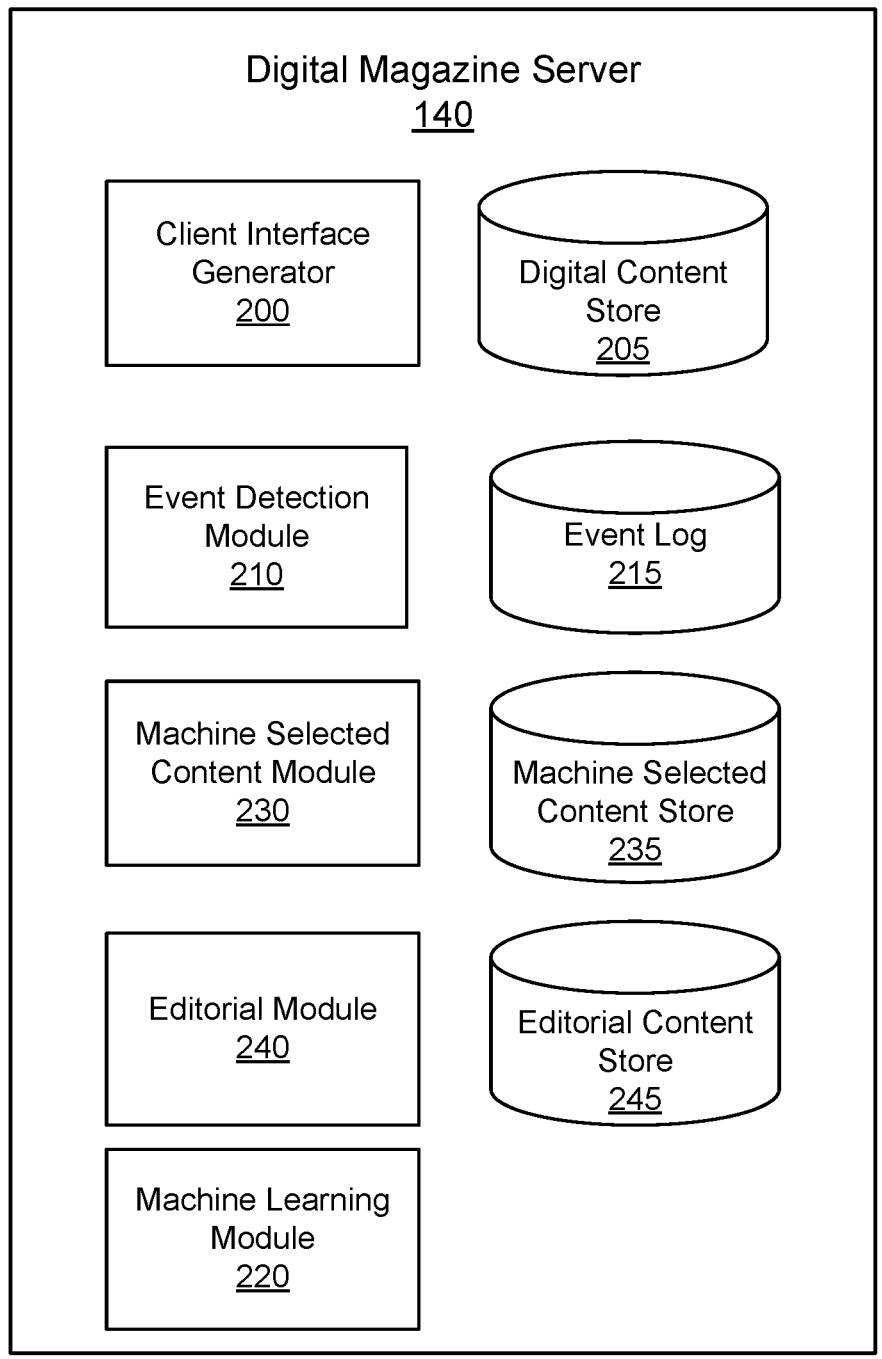
FIG. 2 is a high-level block diagram illustrating a detailed view of the digital magazine server, according to one embodiment.

FIG. 2 is a high-level block diagram of one embodiment of a digital magazine server 140. In the example shown by FIG. 2, the digital magazine server 140 includes a client interface generator 200, a digital content store 205, an event detection module 210, an event log 215, a machine learning module 220, a machine-selected content module 230, a machine-selected content store 235, an editorial module 240, and an editorial content store 245. In other embodiments, the digital magazine server 140 may include additional, fewer, or different components for various applications. In some embodiments, the functions are distributed among by the modules in a different manner than described herein. Moreover, the functions are performed by other entities in some embodiments.

The client interface generator 200 receives requests for digital magazines from the client devices 130 and communicates to the client device 130 digital magazines generated by the digital magazine server 140 in response to the received requests. The client interface generator 200 may provide information included in a received request to the machine-selected content module 230, which uses a model trained by the machine learning module 220 to determine machine-selected content items. Additionally, information included in a request may also be used by the machine-selected content module 230 to update the trained model. In one embodiment, the information included in a received request includes one or more topics selected by the user. For example, a request for a digital magazine indicates one or more topics and the machine learning module 220 uses the one or more topics to update a trained model; for example, topics included in the request are used as a feature (e.g., a root topic) for updating a trained model by the machine learning module 220. A root topic may have one or more subtopics, each of which is more specific than the root topic and provides information to more accurately identify more specific interests of the user. For example, a root topic of "Technology" has a subtopic of "self-driving vehicles." In one embodiment, a topic included in a request is evaluated by the machine learning module 220 in conjunction with a root topic used by a trained model. For example, the trained model applied by the machine learning module applies a logical AND operation with both the topic included in the request and the root topic prior to selecting one or more content items; for example, given a root topic of "Technology" for the trained model and a topic identified by the request of "Design," causing the machine learning module 220 to select content items having topics of both "Technology" and "Design". A digital magazine generated by the digital magazine server 140 in response to a received request is obtained by the client interface generator 200, which transmits the digital magazine to a client device 130 from which the request was received. In embodiments where the digital magazine server 140 updates digital magazines generated for a user, the client interface generator 200 detects an update to a digital magazine and communicates the updated digital magazine, or information identifying one or more changes to the digital magazine, to the client device 130.

The digital content store 205 stores various types of content items obtained by the digital magazine server 140 from one or more sources 110 or from any other suitable entity. In one embodiment, the digital content store 205 stores uniform resource locators (URLs) that each identify a content item. In another embodiment, a content item comprises multiple URLs. For example, the digital content store 205 stores content items received from one or more sources 110 within a threshold amount of time from a current time (e.g., 6 months). Examples of content items stored by the digital content store 205 include page posts, status updates, photographs, videos, links, news articles, audio files, or any other types of content. The machine-selected content module 230 and the editorial module 240 retrieve content items form the digital content store 205, as further described below.

The event detection module 210 detects user interactions with content items displayed on pages of digital magazines on client devices 130. Users may interact with various content items included in digital magazines provided by the digital magazine server 140, and the event detection module 210 obtains information describing these interactions and stores the information describing the interactions in the event log 215. Example interactions with content items include: viewing a content item, sharing a content item with another user, indicating a preference for a content item, indicating a dislike for a content item, including the content item in a digital magazine, storing a content item, commenting on a content item, accessing a content item, reporting one or more issues regarding a content item (e.g., indicating a content item is offensive, indicating a content item is irrelevant to a user, or indicating a content item is an advertisement), adding a new content item to the system, identifying a user associated with a content item, and other types of interactions.

The event log 215 stores user interactions with content items included in digital magazines. For example, the event log 215 stores a description of an interaction with a content item by a user, an identifier of the content item, an identifier of the user who performed the interaction, and a time when the interaction occurred. In some embodiments, the identifier of the content item includes a domain name of a source 110 from which the content item was obtained. In some embodiments, data from the event log 215 includes information included in received requests for digital magazines, which may be obtained from the client interface generator 200. Data from the event log 215 is used to infer interests or preferences of users of the digital magazine server 140 in various embodiments, allowing a more complete understanding of user interests or preferences. For example, content items with which a user previously interacted are retrieved by the digital magazine server 140 using the content item identifiers, allowing the digital magazine server 140 to recommend content items to the user based on the content items with which the user previously interacted.

The machine learning module 220 applies one or more machine learning methods to generate a trained model that outputs machine-selected packages when applied to content items stored in the digital content store 205. A machine-selected package includes one or more content items selected by the trained model, referred to herein as "machine-selected content items." For example, to generate the trained model, the machine learning module 220 identifies a training set of content items from content items stored in the digital content store 205 by identifying a positive training set of content items previously determined to be relevant to a topic (e.g. based on prior user interactions with content items) and identifies a negative training set of content items previously determined to not be relevant to the topic (e.g. based on prior user interaction with the content items).

In some embodiments, the machine learning module 220 generates the training set of content items by identifying a positive training set of content items previously determined to be relevant to a topic and obtained from sources 110 that are trusted and by identifying a negative training set of content items previously determined not to be relevant to the topic and that were obtained from sources 110 that are not trusted. Examples of sources that are trusted include publishers and content providers satisfying one or more criteria maintained by the digital magazine system 140. Example criteria for determining that a source 110 is trusted include receiving at least a threshold amount of content from the source 110, receiving content from the source 110 for at least a threshold amount of time, receiving content having at least a threshold quality (e.g., at least a threshold average quality) from the source 110. Additionally, content items selected by editors are identified as from a trusted source 110, in various embodiments, to facilitate enhanced content selection with editorial content. In some embodiments, content items received from a source 110 to which the user is connected via a social networking system 110 (also referred to as an "influencer") are identified as from a trusted source 110. Similarly, content items obtained from a source 110 determined to be a well-known authority in particular subject matter (e.g., from prior interactions with content from the source 110 or from information received from a third party system) are determined to be from a trusted source 110 for one or more topics associated with the particular subject matter. In some embodiments, an editorial team of the digital magazine server 140 identifies influencers and sources 110 determined to be well-known authorities in various subject matter.

In some embodiments, the machine learning module 220 generates an additional trained model that is applied to a machine-selected package to generate a ranking of the machine-selected content items of the machine-selected package. The additional trained model may be generated using any suitable method or methods in various embodiments. For example, the machine learning module 220 generates the additional trained model by identifying a training set of the machine-selected content items by identifying a higher-ranking set of content items determined to be more relevant to a topic. In some embodiments, the machine learning module 220 also identifies a lower-ranking set of content items determined to be less relevant to the topic.

To generate the trained model and the additional trained model, the machine learning module 220 extracts feature values from the content items of the training sets. A feature corresponds to information potentially relevant to whether the content items are of interest to users. In various embodiments, features correspond to different explicit and implicit signals from users regarding various content items. An explicit signal may be included in a request for a digital magazine received by the client interface generator 200; for example, an explicit signal is an inclusion of a topic or subtopic in a request to a digital magazine server 140 for a digital magazine. Additionally, the explicit and implicit signals from various users may be retrieved from the event log 215. Implicit signals may be retrieved from the event log 215 and correspond to user interactions with content items presented by one or more digital magazines. Example interactions indicating a positive preference for a content item include: sharing a content item with another user, indicating a preference for a content item, indicating a dislike for a content item, including the content item in a digital magazine, storing a content item, commenting on a content item, accessing a content item, and adding a new content item to the system. Example interactions indicating a negative reaction to a content item include reporting one or more issues regarding a content item (e.g., indicating a content item is offensive, indicating a content item is irrelevant to a user, or indicating a content item is an advertisement) and hiding (or dismissing) a content item.

In some embodiments, the machine learning module 220 uses supervised machine learning to train a model for selecting content items and to train an additional model for ranking the selected content items. Different machine learning methods—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. In various embodiments, the machine learning module 220 may use any combination of suitable methods to train the model and the additional model. Different machine learning techniques may be used to train the model and to train the additional model in some embodiments.

The machine-selected content module 230 applies one or more models trained by the machine learning module 220 to content items in the digital content store 205 to generate machine-selected packages for a user. A machine-selected package includes one or more content items associated with a topic and a ranking corresponding to each content item. The ranking corresponding to a content item indicates the content item's relevance to the topic. In some embodiments, positions of machine-selected content items within the machine-selected package are determined by the rankings of machine-selected content items.

In some embodiments, the machine-selected content module 230 adjusts rankings of the machine-selected content items based on one or more other ranking factors. For example, a ranking of a machine-selected content item is modified based on a time when the machine-selected content item was created or when the machine-selected content item was received by the digital magazine sever 140 from a source 110. Other example ranking factors include: a user's affinity for a topic of a content item, a user's affinity for digital magazines including the content item or for digital magazines associated with the topic of the content item, a user's affinity for a source 110 from which the content item was obtained, the popularity of the content item among users of the digital magazine system 140, the frequency with which users of the digital magazine server 140 access the content item, a quality score of the source from which the content item was obtained, a quality score for the content item, and a user-collaborative filter score. If prior interactions by the user with content items indicate an interest in a topic, the user has a high affinity for the topic. Similarly, a user who frequently interacts with a source has a high affinity for the source. A user-collaborative filter score is a matrix factorization method that computes a likelihood the user will have an interest in a content item based on preferences or interactions by other users having similar interests to the user. The machine-selected content module 230 associates weights with different ranking factors in various embodiments. Different ranking factors may be associated with different weights or may be associated with a common weight in various embodiments.

The machine-selected content store 235 stores machine-selected content packages generated by the machine-selected content module 230. Additionally, the machine-selected content store 235 also stores a topic associated with a machine-selected package. In one embodiment, the digital magazine server 140 generates a digital magazine based on one or more machine-selected content packages; the digital magazine is obtained by the client interface generator 200 and communicated to a client device 130 for presentation. In some other embodiments, the machine-selected package is customized by the editorial module 240 before being obtained by the client interface generator 200 and communicated to a client device 130.

The editorial content store 245 stores editorial packages. An editorial package includes one or more editorial content items manually selected by human magazine editors. In various embodiments, an editorial package is associated with one or more topics or interests. For example, an editorial package has 7 editorial content items on a U.S. presidential election manually selected by an editorial team. The number of editorial content items in an editorial package may increase over time. Referring to the preceding example, 5 new editorial content items per day may be added to the editorial package including content items on the U.S. presidential election during the week prior to the date of the U.S. presidential election. In some embodiments, editorial content items are removed from an editorial package over time. For example, editorial content items included in an editorial package for longer than a threshold amount of time from a current time are removed.

In one embodiment, editorial content items are manually selected from sources 110 by human magazine editors. Manual selection includes analysis of the sources 110 of content items by human editors. For example, an original source (e.g., a source 110 that initially generated or provided content on a topic or that first identified one or more details of content) as well as secondary sources 110, which are sources 110 that shared content generated by an original source 110, are considered by human editors. Additionally, human editors account for a balance of sources 110 from which editorial content items are obtained by accounting for known quality of content items associated with different sources 110. In one embodiment, human editors first evaluate content items from sources 110 having at least a threshold position in ranking based on quality of content items provided, then evaluate content items from sources 110 having lower positions in the ranking.

Editorial content items are selected based on one or more criteria. Examples of the criteria include publishing time, detail within a content item, authority of a source 110, authority of a writer or a reporter generating the content item, relevancy of a content item to a topic or to recent information about the topic, aesthetics of the content item, level and attractiveness of image data included in the content item, popularity of the content item, clarity or quality of a headline of the content item, humanness of the content item, popularity of topics included in the content item, and number of interactions with the content item (providing a measure of importance of the content item). Frequency of manual selection of editorial content items may vary. In some embodiments, the frequency with which editorial content items are selected depends on a topic or an interest associated with an editorial package for which editorial content items are selected. For example, editorial content items for an editorial package associated with news are selected hourly or at any other frequent interval. Editorial packages associated with other topics or interests may be updated daily or weekly.

The editorial module 240 customizes machine-selected packages by injecting one or more editorial content items into the machine-selected packages. The editorial module 240 retrieves editorial packages from the editorial content store 245. An editorial package is associated with one or more topics that identify interests to which the editorial package is most closely related. For example, an editorial package including content items relating to an advancement in driverless cars is associated with topics of "technology," 'auto," "artificial intelligence," "driverless cars," and "automation." In one embodiment, the editorial module 240 associates topics with editorial packages. For example, the editorial module 240 applies a model trained by a supervised learning algorithm that automatically identifies topics for an editorial package based on content of editorial content items of the editorial package. In another embodiment, human editors manually identify topics for an editorial package. One or more topics associated with an editorial package are stored in the editorial content store 245 in association with the editorial package.

Based on the one or more topics associated with an editorial package, the editorial module 240 maps the editorial package to one or more machine-selected packages. An editorial package is mapped to one or more machine-selected packages associated with a topic matching the topic associated with the editorial package. The mapping may be done by the editorial module 240 or performed manually.

Once an editorial package is mapped to a machine-selected package, the editorial module 240 injects one or more editorial content items of the editorial package into the machine-selected package. In some embodiments, a position where an editorial content item is injected into the machine-selected package depends on a positional index associated with the editorial content item. The positional index may be determined by the editorial module 240 or manually by human editors. Determination of the position index considers the importance of the editorial content item and a number of machine-selected content items in the machine-selected package, as well as the subject matter of machine-selected content items in the machine-selected package. An editorial content item may be associated with more than one positional index, where each positional index corresponds to a topic. In some embodiments, a positional index is updated based on input from human editors via an interface.

Injection of an editorial content item into the machine-selected package does not replace any machine-selected content items but instead repositions one or more machine-selected content items relative to each other and relative to the editorial content item. For example, the machine-selected package has the machine-selected content items in positions based on a ranking, so injecting an editorial content item into a particular position among the machine-selected content items repositions to lower positions the machine-selected content item previously at that position and all machine-selected content items at positions below it. In one embodiment, all editorial content items in the editorial package are injected into the machine-selected package. For example, editorial content items of the editorial package are injected into the machine-selected package so the editorial content items are positioned before the first content item of the machine-selected package. A customized digital magazine embodying the injection of editorial content items into the machine-selected package is generated by the digital magazine server 140. In some embodiments, if the editorial package is modified or updated, the customized digital magazine is similarly modified or updated to reflect the modification or changes to the editorial package, which may reposition content items in the customized digital magazine relative to each other.

In some embodiments, the client interface generator 200 transmits a machine-selected package and an editorial package to a client device 130. A digital magazine application executing on the client device 130 identifies the editorial package to a user and allows the user to accept or to decline inclusion of the editorial package in a digital magazine. If the digital magazine application receives an acceptance of the editorial package from the user, the user is prompted to provide additional input to the digital magazine application to configure injection of editorial content items of the editorial package into the machine-selected package. For example, a user receiving a digital magazine including content items having a topic of "technology" is prompted to include content from a "product reviews" editorial package, and the digital magazine application includes editorial content items from the "product reviews" editorial package in response to receiving an acceptance of the editorial package. If an editorial package accepted by a user is subsequently modified by one or more editors of the digital magazine server 140, the updated editorial package is received by the client device 130, where the digital magazine application presents the modified editorial package to the user. Editorial content items of an editorial package may be presented in a section of a digital magazine corresponding to a topic of the editorial package in some embodiments. Alternatively, editorial content items of the editorial content package may be included in a section of the digital magazine corresponding to a more general topic of which the topic of the editorial package is a subtopic, which increases a likelihood of the user being presented with the editorial content items. However, if the digital magazine application receives a declination of the editorial package from the user, the digital magazine application presents machine-selected content items of the machine-selected package without also presenting editorial content items of the editorial package.

Content Customization

Figure 3:
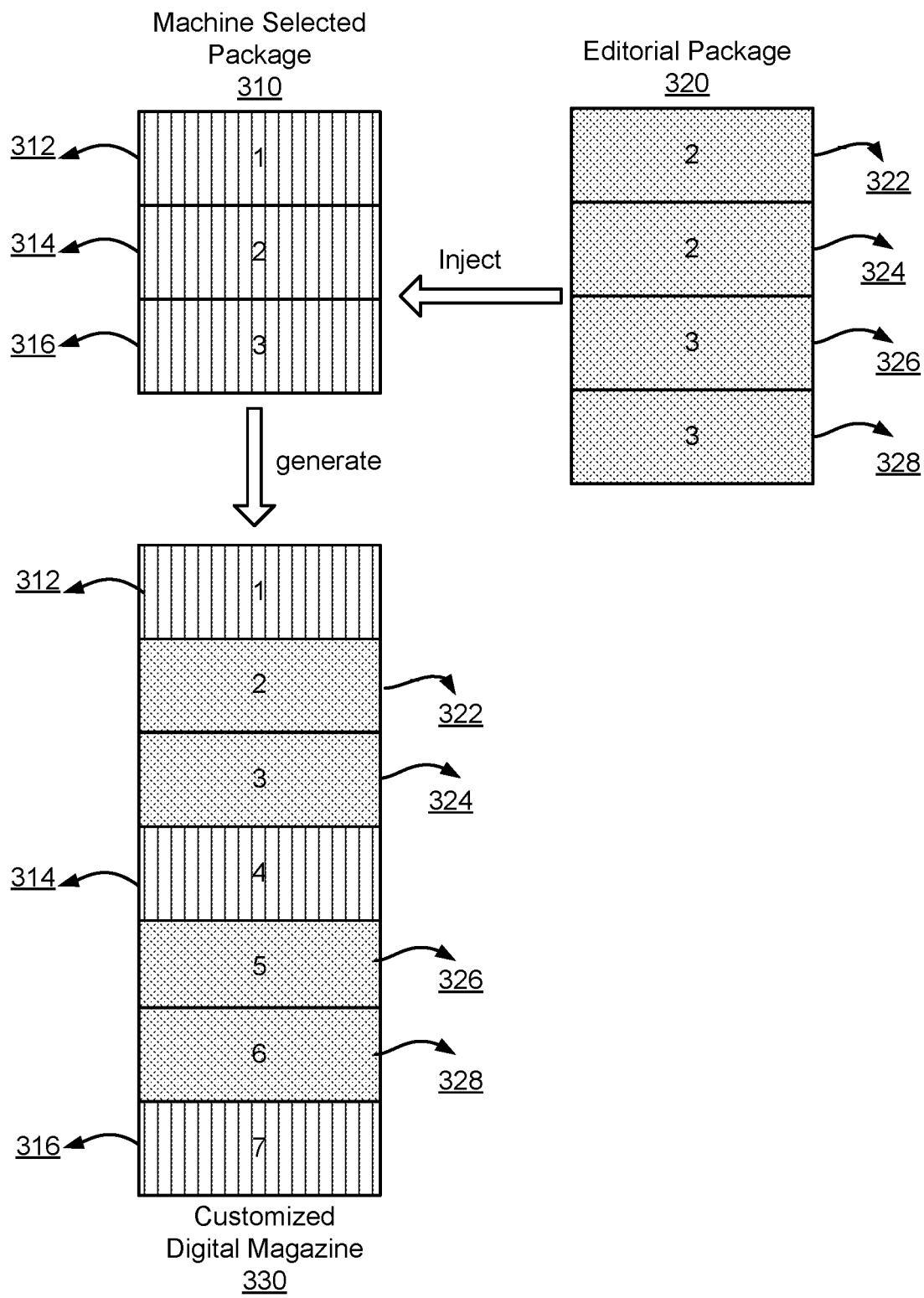
FIG. 3 is an example of injecting an editorial package of content items into a machine-selected package to generate a customized digital magazine, according to one embodiment.

FIG. 3 is an example of injecting an editorial package 320 into a machine-selected package 310 to generate a customized digital magazine 330. In the example of FIG. 3, the machine-selected package 310 includes three machine-selected content items: 312, 314, and 316, which were selected for a user based on a machine training model and share a common topic, which is a topic of the machine-selected package 310 (e.g., the 2016 U.S. presidential election). In the example of FIG. 3, the machine-selected content item 312 is included in the initial position of the machine-selected package 310, followed by the machine-selected content item 314 in the middle position of the machine-selected package 310, with the machine-selected content item 316 in the final position of the machine-selected package 310. As further described above in conjunction with FIG. 2, positions of the three machine-selected content items 312, 314, and 316 in the machine-selected package 310 may be determined by various factors. Examples factors include relevance of subject matter of the machine-selected content items 312, 314, and 316 to the topic of the machine-selected package 310, measures of quality of sources 110 from which the machine-selected content items 312, 314, and 316 were obtained, times when the machine-selected content items 312, 314, and 316 were published, relevance of different machine-selected content items 312, 314, and 316 to interests or preferences of the user, and any other suitable information.

The editorial package 320 in FIG. 3 includes four editorial content items 322, 324, 326, and 328. The four editorial content items are manually selected by human editors and share a common topic, which is a topic of the editorial package 320 (e.g., the winner of the 2016 U.S. presidential election). The topic of the editorial package 320 matches or is otherwise relevant to the topic of the machine-selected package 310. In one embodiment, the editorial package 320 and the machine-selected package 310 have a common topic. In another embodiment, the topic of the machine-selected package 310 is a subtopic of the topic of the editorial package 320. Because of the relationship between the topics of the machine-selected package 310 and of the editorial package 320, the editorial package 320 is mapped to the machine-selected package 310 for customizing the machine-selected package 310. The editorial package 320 may be mapped to one or more other machine-selected packages in addition to the machine-selected package 310.

In various embodiments, the machine-selected package 310 is customized by injecting all the editorial content items of the editorial package 320 into the machine-selected package 310. For example, to inject the editorial package 320, each editorial content item 322, 324, 326, and 328 is assigned a predetermined positional index specifying a location in a ranking of content items. As shown in FIG. 3, the editorial content items 322 and 324 both have a positional index of 2, meaning editorial content items 322 and 324 are to be injected between the machine-selected content items in an initial position and in a second position (between machine-selected content item 312 and machine-selected content item 314, respectively, in the machine-selected package 310 of FIG. 3). In the example of FIG. 3, the editorial content items 326 and 328 have a positional index of 3, meaning they are to be injected between the machine-selected content items in a second position and in a third position (between machine-selected content item 314 and machine-selected content item 316, respectively in FIG. 3). In some embodiments, determination of the positional indices for editorial content items 322, 324, 326, and 328 is manual and involves consideration of the importance or relevance of the editorial content items 322, 324, 326, and 328 to the topic of the machine-selected package 310.

As a result of the injection, a customized digital magazine 330 is generated. The customized digital magazine 330 comprises a sequence of content items that includes all the machine-selected content items 312, 314, and 316 and at least a set of the editorial content items 322, 324, 326, and 328. In the example of FIG. 3, the customized digital magazine 330 includes all of the machine-selected content items 312, 314, and 316 and all of the editorial content items 322, 324, 326, and 328. The machine-selected content items 312, 314, and 316 and the editorial content items 322, 324, 326, and 328 are presented in the customized digital magazine 330 in an order based on the positional indices of the editorial content items 322, 324, 326, and 328. The injected editorial content items 322, 324, 326, and 328 do not replace any machine-selected content items 312, 314, and 316 in the customized digital magazine 330 but instead reposition one or more machine-selected content items 312, 314, and 316 relative to each other. In the example of FIG. 3, the customized digital magazine 330 includes the machine-selected content item 312 in a position that is presented initially in the customized digital magazine 330, with the editorial content items 322 and 324 presented subsequent to the machine-selected content item 312. After presenting the editorial content items 322 and 324, the customized digital magazine 330 presents the machine-selected content item 314 followed by the editorial content items 326 and 328. Finally, the customized digital magazine 330 presents the machine-selected content item 316 in the final position.

While FIG. 3 shows an example where all of the editorial content items 322, 324, 326, and 328 are injected into the machine-selected package 310. However, in other embodiments, one or more editorial content items of the editorial package 320 are not injected into the machine-selected package 310. In some embodiments, injection of editorial content items 322, 324, 326, and 328 into the machine-selected package 310 removes one or more machine-selected content items 312, 314, and 316. For example, resources for presenting the customized digital magazine 330 are constrained, limiting space for presenting the customized digital magazine 330, causing injection of the editorial content items 322, 324, 326, and 328 to remove one or more machine-selected content items 312, 314, and 316 from the customized digital magazine 330.

Figure 4:
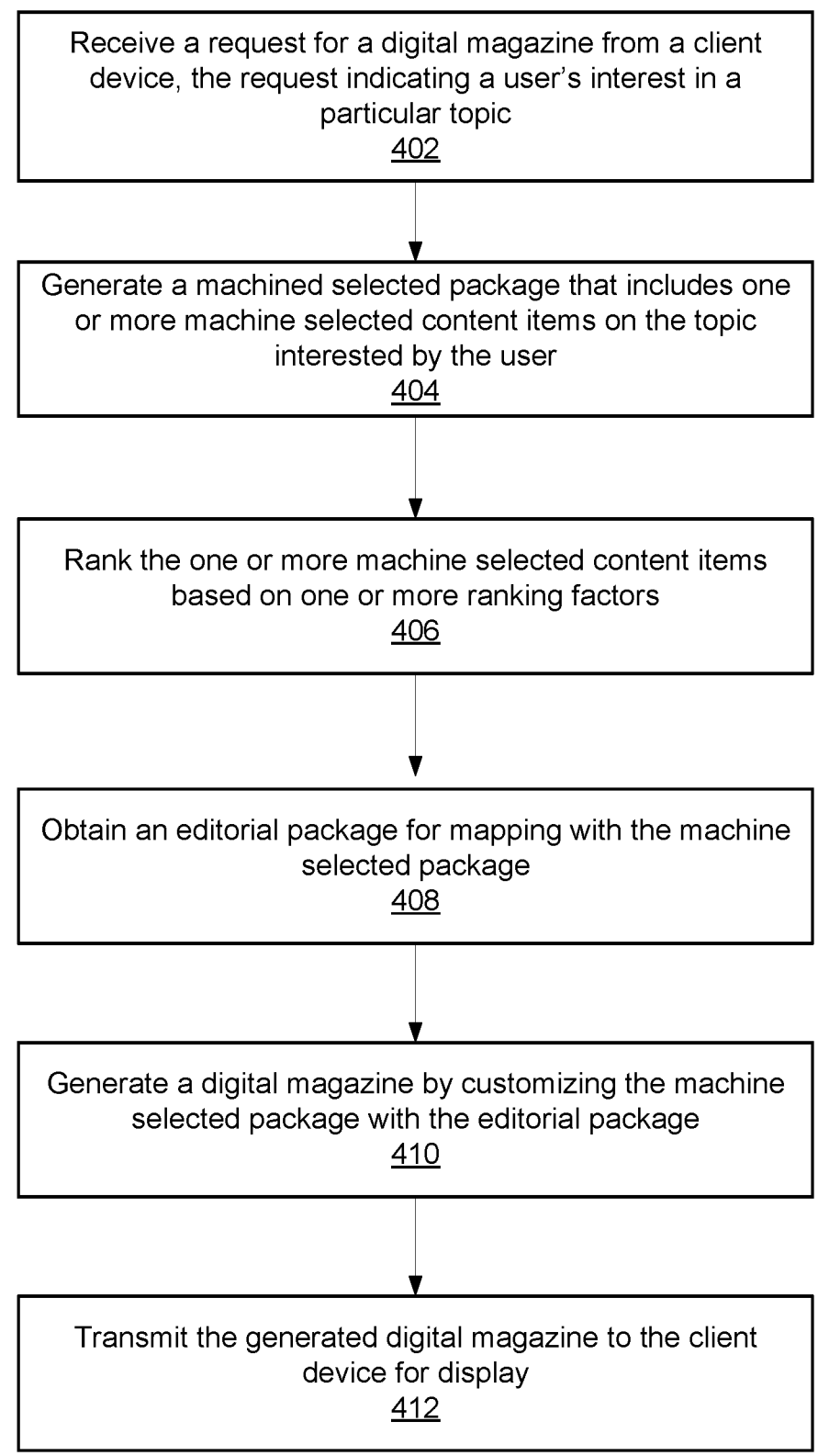
FIG. 4 is a flowchart illustrating a method for generating a customized digital magazine, according to one embodiment.

FIG. 4 is a flowchart of one embodiment of a method for generating a customized digital magazine. In some embodiments, steps of the method are performed by the digital magazine server 140; however, in other embodiments, some or all of the steps of the method may be performed by other entities. In some embodiments, the steps of the method are performed in a different order than the order described in conjunction with FIG. 4 and the method may include different or additional steps.

The digital magazine server 140 receives 402 a request for a digital magazine from a client device 130. In various embodiments, the request includes a particular topic or includes information indicating a user's interest in a particular topic. Based on the request, the digital magazine server 140 generates 404 a machine-selected package that includes one or more content items associated with the topic selected by application of a trained model to content items obtained by the digital magazine server 140. The content items selected by application of the trained model are referred to herein as "machine-selected content items." The digital magazine server 140 ranks 406 machine-selected content items of the machine-selected package. As further described above in conjunction with FIG. 2, the machine-selected content items may be ranked 406 by application of an additional trained model to the machine-selected content items. The additional trained model may account for one or more ranking factors when ranking 406 the machine-selected content items. Example ranking factors include: a user's affinity for a topic of a content item, a user's affinity for digital magazines including the content item or for digital magazines associated with the topic of the content item, a user's affinity for a source 110 from which the content item was obtained, the popularity of the content item among users of the digital magazine server 140, the frequency with which users of the digital magazine server 140 access the content item, a quality score of the source from which the content item, and a connection between the user and another user associated with the content item via the digital magazine server 140 or another social networking system. Other example ranking factors include: the time when a content item was published or obtained by the digital magazine server 140, the level of detail of the content item, a quality score of a source 110 from which the content item was obtained, the aesthetics of the content item, the popularity of the content item among users of the digital magazine system 140, the diversity of sources 110 from which content items were obtained, the humanness of the content item, the clarity or quality of a headline of the content item, and the quality of images included in the content item. In one embodiment, different weights are applied to different ranking factors when ranking 406 the machine-selected content items, while in other embodiments different ranking factors are equally weighted when ranking 406 the machine-selected content items.

The digital magazine server 140 also obtains 408 an editorial content package for mapping to the machine-selected package. The editorial package includes one or more editorial content items that have been manually selected by human editors. The editorial package is associated with a topic and is mapped to the machine-selected package based on the topic associated with the editorial package and a topic associated with the machine-selected package (e.g., the topic used to generate 404 the machine-selected package). The mapping can be done either by the digital magazine server 140 or by human editors. In some embodiments, the digital magazine server 140 obtains 408 an editorial content package having a topic that matches the topic used to generate 404 the machine-selected package. Alternatively, the digital magazine server 140 obtains 408 an editorial content package having a topic that is related to the topic used to generated 404 the machine-selected package (e.g., a topic that is a subtopic of the topic used to generated 404 the machine-selected package or a topic that is a root topic of the topic used to generated 404 the machine-selected package).

The digital magazine server 140 generates 410 a digital magazine by combining one or more content items of the editorial package with the machine-selected content items of the machine-selected package with the editorial package. Thus, the digital magazine includes the machine-selected package and at least a set of content items of the editorial package. In some embodiments, the digital magazine includes the machine-selected package and all content items of the editorial package. As further described above in conjunction with FIG. 3, the digital magazine includes content items of the editorial package in positions relative to machine-selected content items based on a positional index corresponding to the editorial package. Accordingly, when generating 410 the digital magazine, the digital magazine server 140 repositions machine-selected content items relative to each other so one or more content items of the editorial package are included in positions specified by the positional index. After generating 410 the digital magazine, the digital magazine server 140 transmits 412 the generated digital magazine to the client device 130 from which the request was received 402 for display to the user.

Figure 5:
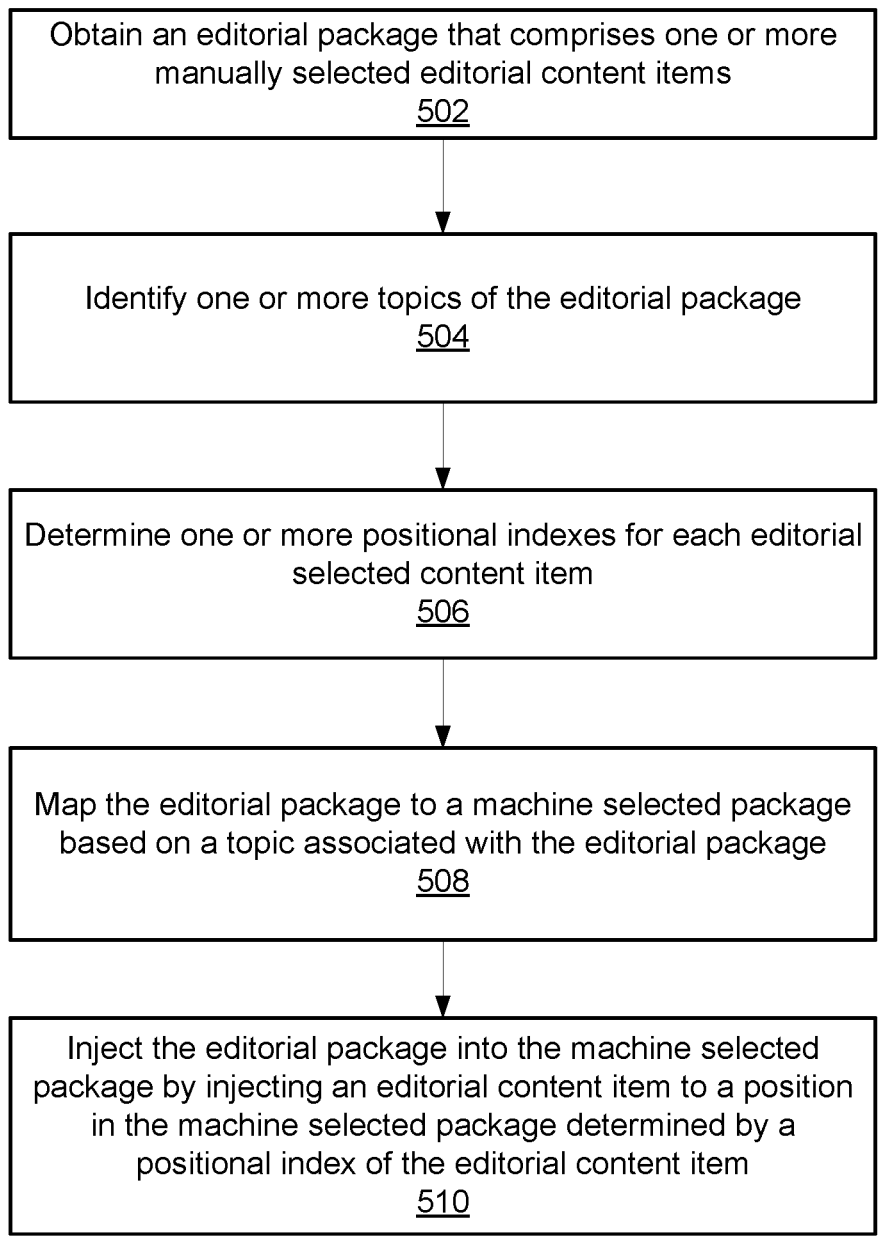
FIG. 5 is a flowchart illustrating a method for injecting an editorial package of content items into a machine-selected package of content items, according to one embodiment.

FIG. 5 is a flowchart of one embodiment of a method for injecting an editorial package of content items into a machine-selected package of content items. In some embodiments, the method is performed by the digital magazine server 140, although some or all of the operations in the method may be performed by other entities in other embodiments. In some embodiments, the steps of the method are performed in a different order than the order described in conjunction with FIG. 5, and the method may include different or additional steps in some embodiments.

The digital magazine server 140 obtains 502 an editorial package that includes one or more manually selected content items, referred to herein as "editorial content items." The digital magazine server 140 identifies 504 one or more topics of the editorial package. For example, the digital magazine server 140 identifies 504 topics associated with at least a threshold amount (e.g., a threshold number, a threshold percentage) of editorial content items.

For each editorial content item, the digital magazine server 140 determines 506 one or more positional indices. A positional index for an editorial content item specifies a position where the editorial content item is injected into the machine-selected package. In various embodiments, a positional index for an editorial content item is based at least in part on a topic associated with the editorial package. For example, if the editorial package is associated with a topic and an additional topic, an editorial content item of the editorial package has a positional index corresponding to the topic and an additional positional index corresponding to the additional topic. The digital magazine server 140 maps 508 the editorial package to a machine-selected package including content items based on a topic of the editorial package. For example, the editorial package is mapped 508 to a machine-selected package associated with a topic matching a topic of the editorial package. As another example, the editorial package is mapped 508 to a machine-selected package having a topic that is a subtopic of a topic of the editorial package. In some embodiments, one or more human editors identify 504 one or more topics of the editorial package, determine 506 one or more positional one or more positional indices for editorial content items, and map 508 the editorial package to a machine-selected package. Alternatively, the digital magazine server 140 identifies 504 one or more topics of the editorial package, determines 506 one or more positional indices for editorial content items, and maps 508 the editorial package to a machine-selected package.

The digital magazine server 140 injects 510 the editorial package into the machine-selected package by injecting one or more editorial content items into the machine-selected package at positions determined by a positional index of the one or more editorial content items. If an editorial content item has more than one positional index, the digital magazine server 140 identifies a positional index corresponding to a topic used to map 508 the editorial package to the machine-selected package and uses the identified positional index to inject 510 one or more editorial content items from the editorial package into the machine-selected package. In different embodiments, different numbers of editorial content items are injected 510 into the machine-selected package.

Figure 6:
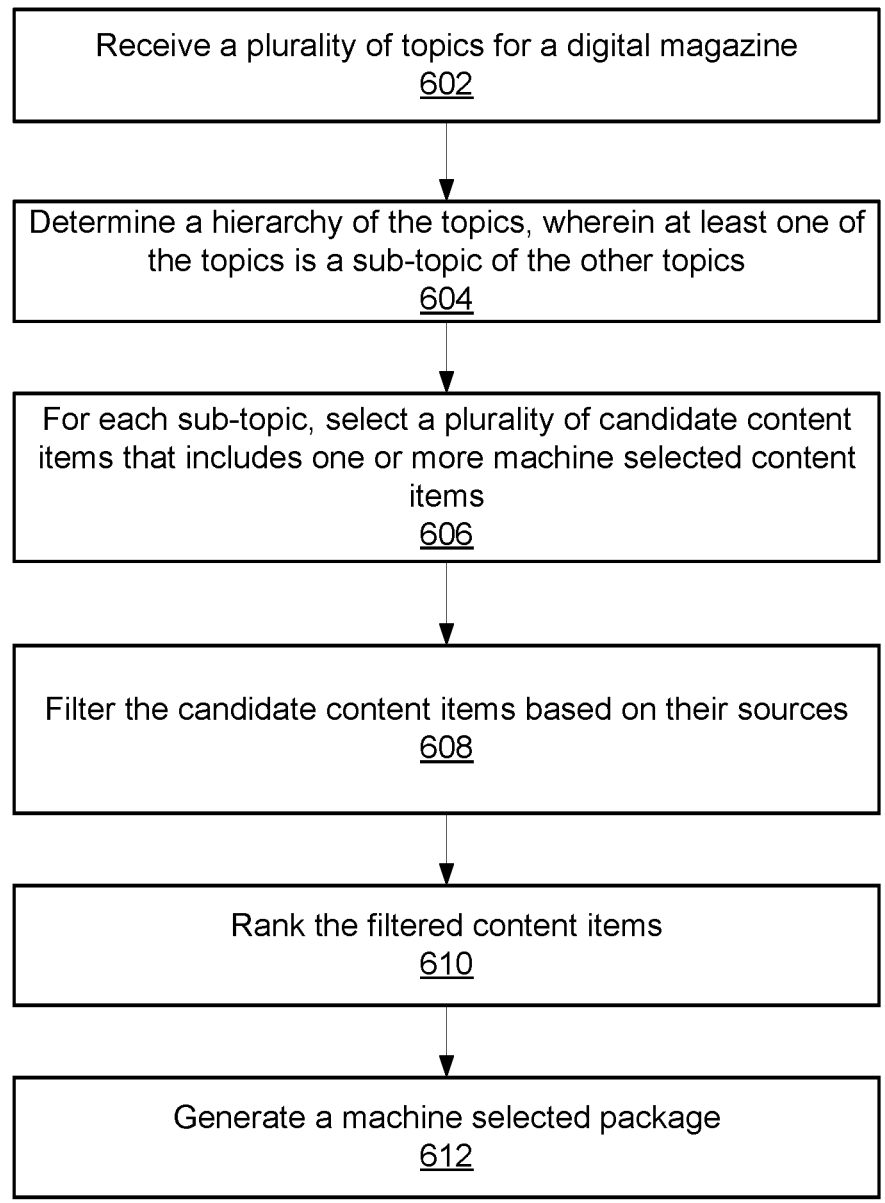
FIG. 6 is a flowchart illustrating a method for enhanced content selection by a model trained on machine-learning techniques based on editorial content, according to one embodiment.

FIG. 6 is a flowchart of one embodiment of a method for enhancing content selection by a trained model using editorial content. In some embodiments, the method is performed by the digital magazine server 140, although some or all of the steps of the method may be performed by other entities in other embodiments. In some embodiments, steps of the method are performed in a different order than the order described in conjunction with FIG. 6 and may include different or additional steps.

The digital magazine server 140 receives 602 a plurality of topics for a digital magazine, with one or more of the topics being a subtopic of another topic. The topics include a root topic and an optional set of customization topics, one or more of which are subtopics of the root topic. In various embodiments, the customization topics are specified by a user. For example, the customization topics are included in a request for a digital magazine received by the digital magazine server 140. In some embodiments, the digital magazine server 140 determines 604 a hierarchy of topics based on the received plurality of topics, while in other embodiments, one or more human editors determines 604 the hierarchy of topics.

To determine 604 the hierarchy of topics, the digital magazine server 140 or the editorial team analyzes the logical relationship between the received topics. As at least one of the topics is a subtopic of the other topics, analyzing the logical relationship between received topics determines a hierarchy of received topics. For example, when topics of "Sports," "NBA," "Golden State Warriors," and "Kevin Durant," are received, "Kevin Durant" is determined to be a subtopic of "Golden State Warriors," "Golden State Warriors" is determined to be a subtopic of "NBA," and "NBA" is determined to be a subtopic of "Sports." In some embodiments, editorial content for different received topics is used to determine the hierarchy.

For each received topic determined to be a subtopic, the digital magazine server applies a trained model to select 606 a plurality of candidate content items that includes one or more machine-selected content items having a topic matching a determined subtopic. Additionally, the candidate content items may include one or more editorial content. In various embodiments, the digital magazine server 140 selects candidate content items based on the topics associated with content items and the quality of content items. For example, the digital magazine server 140 selects 606 content items associated with a root topic identified from the received topics and at least a threshold amount of topics determined to be a subtopic of the root topic. As another example, the digital magazine server 140 selects 606 content items having at least a threshold. Indicators of quality of a content item may include the quality of a source 110 from which the content items was received, interactions with the content item (e.g., indications of preference for the content item, viewing of the content item, sharing of the content item with other users, including the content item in one or more digital magazines, commenting on the content item, etc.), and references to the content item by other users. The candidate content items are selected 606 from one or more sources 110 or from storage devices of the digital content server 140 (e.g., a digital content store 205, a machine-selected content store 235, an editorial content store 245).

The digital magazine server 140 filters 608 the candidate content items based on their sources 110. For example, the digital magazine server 140 identifies candidate content items associated with trusted sources. Editorial content items retrieved are identified as associated with a trusted source 110. Additionally, the digital magazine server 140 identifies sources 110 that provided content items for at least a threshold amount of time, that provided content items having at least a threshold length, or that provided content items having at least a threshold quality, as trusted. In some embodiments, content items received from a source 110 to which the user is connected via a social networking system (also referred to as an "influencer") are identified as from a trusted source 110. Similarly, content items obtained from a source 110 determined to be a well-known authority in particular subject matter (e.g., from prior interactions with content from the source 110 or from information received from a third party system) are determined to be from a trusted source 110 for one or more topics associated with the particular subject matter. In some embodiments, candidate content items including content items obtained from an influencer or a well-known authority in a particular subject matter matching or related to a received topic are selected 606 as candidate content items and identified as associated with a trusted source 110. In various embodiments, filtering 608 the candidate content items removes candidate content items that are not associated with a trusted source.

Based on one or more ranking factors, further described above in conjunction with FIG. 2, the digital magazine server 140 ranks 610 the filtered candidate content items to generate 612 a machine-selected package including the filtered candidate content items and the ranking. The machine-selected package includes the filtered candidate content items, with each filtered candidate content item placed at a location in a digital magazine determined by its corresponding ranking. In some embodiments, the digital magazine server 140 transmits the machine-selected package to a client device 130 for presentation to the user. In other embodiments, the machine-selected package is customized to include one or more editorial content items before being transmitted to the client device 130, as further described above in conjunction with FIGS. 2-5.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it also has proven convenient at times to refer to these arrangements of operations as modules, without loss of generality. The described arrangements of operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. From the above discussion, many variations will be apparent to one skilled in the relevant art that would yet be encompassed by the spirit and scope of the invention.

What is claimed is:

1. A method, comprising:
   receiving a request from a user for a digital magazine at a digital magazine server, wherein the request comprises a plurality of topics;
   determining a hierarchy of the plurality of topics identified by the request, the hierarchy identifying a root topic and one or more sub-topics of the root topic from the plurality of topics, each of the one or more sub-topics being a subset of the root topic;
   selecting one or more content items from a plurality of content items to include in the digital magazine requested by the user, wherein the one or more content items are selected based on the determined hierarchy of the plurality of topics and a trained model, the model trained to output a selection of content items from a pool of content items based on topics;
   generating the digital magazine by combining the one or more content items with a manually selected content item, wherein combining the one or more content items with the manually selected content item comprises:
  determining a positional index of the manually selected content item based on a topic of the manually selected content item that corresponds to a topic of determined hierarchy of the plurality of topics, the positional index specifying a location where the manually selected content item is to be presented relative to the one or more content items;
  transmitting the generated digital magazine to a client device for presentation to the user, wherein the generated digital magazine is presented such that the manually selected content item is presented relative to the one or more content items in accordance with the positional index.

2. The method of claim 1, wherein selecting the one or more content items from the plurality of content items based at least on the hierarchy of the plurality of topics and the trained model comprises:
  applying a logical AND operation to the root topic and the one or more sub-topics;
  applying the trained model to a result of the logical operation and the plurality of content items; and
  receiving a selection of a subset of the plurality of content items from the trained model.

3. The method of claim 2, further comprising:
  identifying the one or more content items from the subset based on sources of the one or more content items.

4. The method of claim 1, wherein generating the digital magazine by combining the one or more content items in the subset with the manually selected content items comprises:
  ranking the one or more content items based on prior interaction with the one or more content items by users of the digital magazine server; and
  generating the digital magazine based on the ranking.

5. The method of claim 4, wherein the prior interaction with the one or more candidate content items by users of the digital magazine server is selected from a group consisting of: sharing a candidate content item with another user, indicating a preference for the candidate content item, indicating a dislike for the candidate content item, including the candidate content item in a digital magazine, storing the candidate content item, commenting on the candidate content item, accessing the candidate content item, and any combination thereof.

6. The method of claim 1, further comprising:
  extracting a new feature from the root topic and the one or more sub-topics identified from the request; and
  using the new feature to further train the trained model.

7. A non-transitory computer readable medium storing executable computer program instructions, the computer program instructions comprising instructions that when executed cause a computer processor to:
  receive a request from a user for a digital magazine at a digital magazine server, wherein the request comprises a plurality of topics;
  determine a hierarchy of the plurality of topics identified by the request, the hierarchy identifying a root topic and one or more sub-topics of the root topic from the plurality of topics, each of the one or more sub-topics being a subset of the root topic;
  select one or more content items from a plurality of content items to include in the digital magazine requested by the user, wherein the one or more content items are selected based on the determined hierarchy of the plurality of topics and a trained model, the model trained to output a selection of content items from a pool of content items based on topics;
  generate the digital magazine by combining the one or more content items with a manually selected content item, wherein combining the one or more content items with the manually selected content item comprises:
    determining a positional index of the manually selected content item based on a topic of the manually selected content item that corresponds to a topic of determined hierarchy of the plurality of topics, the positional index specifying a location where the manually selected content item is to be presented relative to the one or more content items; and
  transmit the generated digital magazine to a client device for presentation to the user, wherein the generated digital magazine is presented such that the manually selected content item is presented relative to the one or more content items in accordance with the positional index.

8. The non-transitory computer readable medium of claim 7, wherein the computer program instructions for selecting the one or more content items from the plurality of content items based at least on the hierarchy of the plurality of topics and the trained model comprise instructions that when executed cause the computer processor to:
  apply a logical AND operation to the root topic and the one or more sub-topics;
  apply the trained model to a result of the logical operation and the plurality of content items; and
  receiving a selection of a subset of the plurality of content items from the trained model.

9. The non-transitory computer readable medium of claim 8, wherein the computer program instructions further comprise instructions that when executed cause a computer processor to:
  identify the one or more content items from the subset based on sources of the one or more content items.

10. The non-transitory computer readable medium of claim 7, wherein the computer program instructions for generating the digital magazine by combining the one or more content items in the subset with the manually selected content items comprise instructions that when executed cause the computer processor to:
  rank the one or more content items based on prior interaction with the one or more content items by users of the digital magazine server; and
  generate the digital magazine based on the ranking.

11. The non-transitory computer readable medium of claim 10, wherein the prior interaction with the one or more candidate content items by users of the digital magazine server is selected from a group consisting of: sharing a candidate content item with another user, indicating a preference for the candidate content item, indicating a dislike for the candidate content item, including the candidate content item in a digital magazine, storing the candidate content item, commenting on the candidate content item, accessing the candidate content item, and any combination thereof.

12. The non-transitory computer readable medium of claim 7, wherein the computer program instructions further comprise instructions that when executed cause a computer processor to:
  extract a new feature from the root topic and the one or more sub-topics identified from the request; and
  use the new feature to further train the trained model.

13. A computer system, comprising:
  a computer processor for executing computer program instructions; and a non-transitory computer-readable memory storing computer program instructions executable by the computer processor to perform operations comprising:
  receiving a request from a user for a digital magazine at a digital magazine server, wherein the request comprises a plurality of topics;
  identifying a plurality of topics from the request;
  determining a hierarchy of the plurality of topics identified by the request, the hierarchy identifying a root topic and one or more sub-topics of the root topic from the plurality of topics, each of the one or more sub-topics being a subset of the root topic;
  selecting one or more content items from a plurality of content items to include in the digital magazine requested by the user, wherein the one or more content items are selected based on the determined hierarchy of the plurality of topics and a trained model, the model trained to output a selection of content items from a pool of content items based on topics;
generating the digital magazine by combining the one or more content items with a manually selected content item, wherein combining the one or more content items with the manually selected content item comprises:
  determining a positional index of the manually selected content item based on a topic of the manually selected content item that corresponds to a topic of determined hierarchy of the plurality of topics, the positional index specifying a location where the manually selected content item is to be presented relative to the one or more content items;
transmitting the generated digital magazine to a client device for presentation to the user, wherein the generated digital magazine is presented such that the manually selected content item is presented relative to the one or more content items in accordance with the positional index.

14. The computer system of claim 13, wherein selecting the one or more content items from the plurality of content items based at least on the hierarchy of the plurality of topics and the trained model comprises:
  applying a logical AND operation to the root topic and the one or more sub-topics;
  applying the trained model to a result of the logical operation and the plurality of content items; and
  receiving a selection of a subset of the plurality of content items from the trained model.

15. The computer system of claim 13, wherein generating the digital magazine by combining the one or more content items in the subset with the manually selected content items comprises:
  ranking the one or more content items based on prior interaction with the one or more content items by users of the digital magazine server; and
  generating the digital magazine based on the ranking.

16. The computer system of claim 15, wherein the prior interaction with the one or more candidate content items by users of the digital magazine server is selected from a group consisting of: sharing a candidate content item with another user, indicating a preference for the candidate content item, indicating a dislike for the candidate content item, including the candidate content item in a digital magazine, storing the candidate content item, commenting on the candidate content item, accessing the candidate content item, and any combination thereof.

17. The computer system of claim 13, wherein the operations further comprise:
  extracting a new feature from the root topic and the one or more sub-topics identified from the request; and
  using the new feature to further train the trained model.

* * * * *